United States Patent [19]

Charves et al.

[11] 4,101,497

[45] Jul. 18, 1978

[54] SEALANT-PRIMER COATING

[75] Inventors: Everett Charves, Holland; David F. Pulley, Warrington; Arthur O. Stander, Jenkintown, all of Pa.

[73] Assignee: The United States of America as represented by the Secretary of the Navy, Washington, D.C.

[21] Appl. No.: 747,461

[22] Filed: Dec. 3, 1976

[51] Int. Cl.² .............................................. C08K 5/10
[52] U.S. Cl. .......................... 260/31.2 N; 260/32.8 N; 260/33.6 UB; 260/830 P
[58] Field of Search .................. 260/30.4 N, 30.4 EP, 260/31.2 N, 32.6 NR, 33.2 EP, 33.4 EP, 33.4 UR, 33.6 EP, 33.6 UB, 75 NH, 830 P

[56] References Cited

U.S. PATENT DOCUMENTS

| | | | |
|---|---|---|---|
| 3,267,078 | 8/1966 | Damusis | 260/33.6 UB |
| 3,445,436 | 5/1969 | Lake | 260/33.6 EP |
| 3,525,779 | 8/1970 | Hawkins | 260/30.4 EP |
| 3,565,972 | 2/1971 | Harris | 260/830 P |
| 3,574,127 | 4/1971 | Scheibelhoffer | 260/75 NH |
| 3,652,485 | 3/1972 | Cizek | 260/33.6 UB |
| 3,748,292 | 7/1973 | Stander | 260/830 P |

OTHER PUBLICATIONS

May & Tanaka, "Epoxy Resins — Chemistry & Technology," Marcel Dekker, New York, 1973, p. 244.

Leet Neville, "Handbook of Epoxy Resins", McGraw–Hill, New York, 1967, pp. 7-25, 23-27.

*Primary Examiner*—Paul R. Michl
*Attorney, Agent, or Firm*—R. S. Sciascia; Henry Hansen

[57] ABSTRACT

A coating which is both a flexible sealant and a corrosion-inhibitive primer which can be used to protect the exterior skin and fastener patterns of high performance aircraft at low temperatures. The coating includes corrosion inhibitive pigmentation, resins, a curing agent, and a solvent blend permitting spray application of the coating. The two resins included in the coating are a reaction product of an epichlorohydrin and bisphenol A plus a polyurethane elastomer which is a reaction product of an aromatic isocyanate and a polyether glycol. The curing agent is a blocked diamine, i.e., a ketimine. The ketimine can be prepared by reacting a carbonyl compound and an aromatic diamine. Water is produced in this reaction. The reaction is reversible, so that as the ketimine absorbs atmospheric moisture, the aromatic diamine is released and in turn cures or cross-links the resins. The mixture of pigmentation, resins, ketimine, and solvent blend is a sprayable material that can be readily applied to surfaces using conventional spray equipment. After application, as the diamine is released, the coating is cured to a tough weather-resistant film. When utilized to protect exterior surfaces, a durable exterior coating can then be applied over the flexible sealant-primer to obtain a two-coat, all weather protective paint system.

1 Claim, No Drawings

SEALANT-PRIMER COATING

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

The present invention relates to protective coating for aircraft and other applications, and more particularly to coatings for the protection of surfaces including features, such as fastener head patterns, that flex or work in service.

It has been the general practice in protective coating systems to apply a primer to the structure or surface to be protected, followed by a topcoat. In protective coating systems for structures having high stress areas such as exterior fastener head patterns, such as high speed aircraft, it has been the general practice to apply, between application of the primer and the topcoat, a flexible sealant over such areas or patterns to relieve the flexing stresses that would otherwise cause the topcoat to crack, thus exposing the underlying metal or surface to environmental attack. The sealant, such as is disclosed in MIL-S-81733, is capable of withstanding strain at low temperatures, such as is experienced by the skin of high speed aircraft, in order to keep the coating from cracking around aircraft fastener heads. The primer alone does not have the flexibility to provide this protection. However, this three-coating system has not provided the needed flexibility at extreme low temperatures under high altitude flight conditions to prevent cracking in high stress areas. Furthermore, the sealant takes a considerable amount of time to apply and does not have sufficient tensile strength, adhesion, toughness, flexibility, or corrosion inhibitive properties to function without a primer coat. In addition, the need to apply three coats, one over the other, adds complexity and is time consuming.

SUMMARY OF THE INVENTION

Accordingly, it is a general purpose of the present invention to provide a protective coating material which alone functions both as a corrosion inhibitive primer and as a sealant flexible at low temperatures, in one coating or application.

Other objects of the present invention are to provide a protective coating which can inhibit corrosion of the metallic structure to which it is applied, which is capable of providing corrosion protection for the structure to which it is applied even if the top coating becomes cracked, which can prevent the penetration of corrosive salts and stack gases causing corrosion, which can resist abrasion, which has good adhesion, and which can be topcoated.

Further objects of the present invention are to provide a protective coating which is easy to apply, has good pot life, has good toughness, has sufficient flexibility to withstand strain and fatigue at low temperatures to prevent cracking at high stress areas, and has good tensile strength.

Still further objects of the present invention are to provide a flexible sealant primer composition for aircraft which provides improved corrosive protection under prolonged exposure to severe salt water spray and extreme low temperature environments, and which simplifies and reduces the time required for complete application of the entire coating by substituting one material for two (primer and sealant).

Briefly, these and other objects of the invention are accomplished by a liquid coating composition including an epoxy, pigments including corrosion inhibitor, polyurethane elastomer, ketimine curing agent, and solvents for sprayability. The epoxy is a reaction product of epichlorohydrin and bisphenol A having an average epoxide equivalent ranging from 185 to 550. The pigments used include strontium chromate as a corrosion inhibitor. The polyurethane elastomer is a reaction product of an aromatic isocyanate (such as 2,4-toluene diisocyanate) and a polyether glycol (such as polytetramethylene ether glycol). The epoxy and polyurethane are crosslinked using a blocked diamine, i.e., a ketimine. The ketimine is produced by the condensation reaction of an aromatic diamine such as methylene dianiline and a carbonyl compound such as a volatile ketone. After application, atmospheric moisture reacts with the ketimine to break it down into the initial reactants. The ketone evaporates off while the methylene dianiline reacts and cross-links with the epoxy and polyurethane. The solvents can be organic ketones, acetates, or diluents of sufficient quantity for spray application. Until needed for use, the ingredients should be separated in three containers, one for the epoxy, pigments and solvents, one for the polyurethane, and one for the ketimine curing agent. When these ingredients are combined, the resultant is a sprayable mixture that can readily be applied to surfaces using conventional spray equipment. After this coating has been applied, a durable exterior coating or topcoat can then be applied over the flexible sealant-primer to obtain a two-coat all weather protective paint system.

DESCRIPTION OF THE PREFERRED EMBODIMENT

The coating composition of this invention includes a primer vehicle which includes two resins: an epoxy resin and an aromatic polyurethane resin.

The epoxy resin is characterized by the presence of at least one epoxide end group

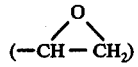

in an organic molecule. Such resins are reaction products of epichlorohydrin and bisphenol A having an average epoxide equivalent ranging from 185 to 550. The molecular weight of the resulting polymer is a function of the ratio of these reactants and can be represented by the following formula:

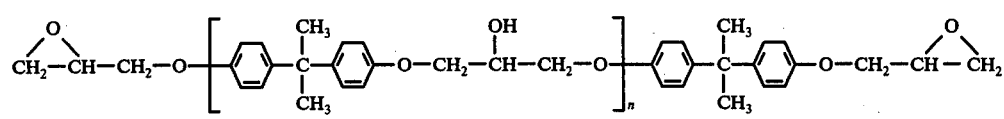

The aromatic polyurethane resin is made from polyether diols having a tetramethylene oxide repeating unit (such as is polytetramethylene ether glycol) reacted with a molar excess of toluene diisocyanate to yield a prepolymer with terminal isocyanate groups. The reaction proceeds as follows:

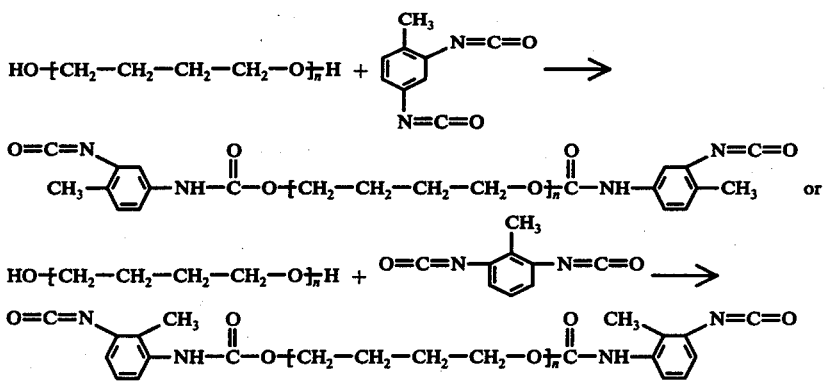

Aromatic type curing agents such as methylene dianiline (MDA) and 4,4'-methylene-bis-(2-chloroaniline) are possible curing agents for the epoxy/polyurethane coating system. The high reactivity of these aromatic diamines limits the pot life of the premixed coating, thereby limiting the spray application time. A blocked diamine (ketimine), synthesized by reacting an aromatic diamine (such as MDA) and a carbonyl compound (such as a ketone), the percent solids of which are calculated to chemically combine and cross-link the coating, is utilized as the cross-linking (curing) agent for the sealant-primer. Such a curing agent is disclosed in U.S. patent application Ser. No. 718,483, filed Aug. 30, 1976. The ketimine is synthesized as follows, where MDA and a ketone are used:

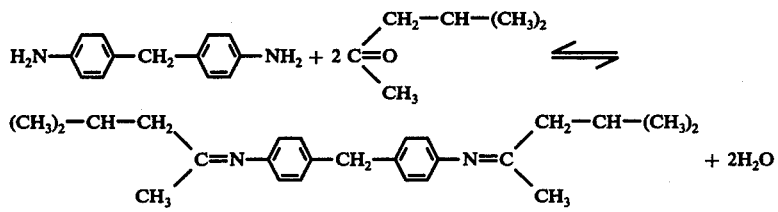

The reaction is reversible, so that as the ketimine absorbs atmospheric moisture, the free diamine upon release cures or cross-links the coating. Utilizing the blocked diamine, the sealant-primer of this invention cross-links as follows, the curing agent being capable of reacting with the epoxy and polyurethane resins:

A-Reaction: The reactive hydrogen atoms on the amine molecule are displaced by epoxy molecules in two successive steps:

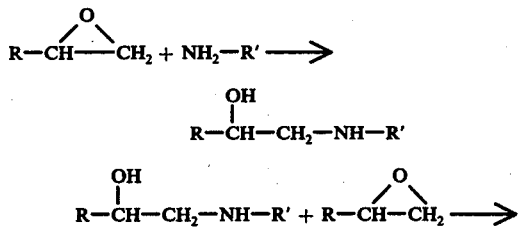

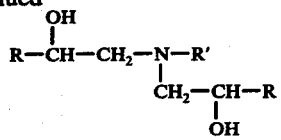

Therefore, the use of a curing agent containing a plurality of primary or secondary groups, as a curing agent for the diepoxide, will yield a three-dimensional cross-linked polymer network.

B-Reaction: The reactive hydrogen atoms of the amino groups also react with the isocyanate molecule to yield a substituted urea:

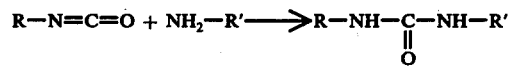

The secondary product of this reaction, biuret, does not proceed to any measurable extent unless heated:

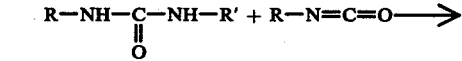

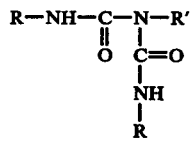

In the presence of atmospheric moisture, the isocyanate molecule can convert itself to a primary amine with the evolution of carbon dioxide gas. Because of this, it is necessary to keep the container holding the isocyanate component tightly sealed until ready for use.

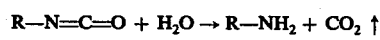

The presence of 0.01% water is sufficient to cause this reaction. The carbon dioxide produced thereby can cause the container to bulge, which can be utilized as an indicator of an unusable isocyanate component.

The coating composition of the invention includes epoxy resin and aromatic polyurethane resin in a ratio by weight of epoxy resin to aromatic polyurethane resin which is within the range from 1:9 to 9:1, ketimine curing agent of a stoichiometric amount of cross-link the selected amounts of epoxy resin and aromatic polyurethane resin, and a solvent (straight chain, branched or aromatic as diluent) in an amount sufficient to permit application of the composition to a surface. The relative proportions of epoxy resin and polyurethane resin can be varied to obtain the desired adhesion, hardness and brittleness, which increase with increasing proportions of epoxy resin. For proper application, the composition includes sufficient solvent for a viscosity reading on the Ford No. 4 viscosity cup of between 10 and 100 seconds for spray application and of between 100 and 200 seconds for brush application. Some solvents suitable for use in the present invention include methyl ethyl ketone, methyl n-butyl ketone, xylene, butyl acetate, toluene and any combination thereof. All of the above solvents should be urethane grade, free of (OH) hydroxyl end groups. Corrosion inhibitor such as strontium chromate, zinc molybdate or calcium molybdate can be added to this composition in an amount in the range of from 1 to 25 percent by weight, so that the applied coating can better provide corrosion protection to the substrate.

The following specific example of the formulation is intended to illustrate the invention but not limit it in any way:

EXAMPLE

The following formulation is that of a corrosion inhibitive sealant/primer and includes the following ingredients in the following proportions by weight:

| COMPONENT A | |
|---|---|
| Ingredients | Parts-by-Weight |
| epoxy resin having an epoxide equivalent between 185 and 196, viscosity between 110 and 160 poises, and density between 9.6 and 9.8 lbs./gal. at 68° F | 291 |
| strontium chromate | 1701 |
| titanium dioxide | 319 |
| magnesium silicate | 788 |
| diatomaceous silica | 414 |
| leveling agent | 135 |
| methyl n-butyl ketone, urethane grade | 3386 |

| COMPONENT B | |
|---|---|
| Ingredients | Parts-by-Weight |
| ketimine curing agent | 1680 |
| methyl ethyl ketone, urethane grade | 2754 |

| COMPONENT C | |
|---|---|
| Ingredients | Parts-by-Weight |
| polyurethane resin having a 100% modulus of 400 psi at 100° C and an available isocyanate content of 2.8% | 1740 |
| polyurethane resin having a 100% modulus of 1100 psi at 100° C and an available isocyanate content of 4.1% | 873 |
| xylene, urethane grade | 1214 |
| butyl acetate, urethane grade | 699 |
| toluene, urethane grade | 634 |

This composition is to be packaged in three separate containers. The pigment-containing component (Component A) should first be ground to a minimum fineness of 6 on a Hegmann scale. The other components can be mixed with any suitable dispersion equipment. The proportions of each member of each component are arranged so that Components A, B and C are blended in a 1:1:1 ratio by volume, and thinned to spray viscosity (if necessary) with methyl ethyl ketone or other solvent, to produce the desired coating material. The premixed coating has a work life or pot life of approximately four to six hours, allowing ample time to prepare and apply the coating utilizing conventional spray equipment and application techniques. The pot life also allows sufficient time to clean the apparatus before gellation occurs.

The coating cross-links to a dry, tack free and hard but flexible film in approximately one hour at room temperature. The coating exhibits excellent adhesion to aluminum substrates, chemically treated or anodized. Corrosion inhibition and flexibility is provided from 350° F to −60° F.

In addition to the epoxy resin, polyurethane resins and curing agent, the formulation of this example contains other ingredients. Strontium chromate and titanium dioxide are pigments used to provide corrosion inhibition and opacity, respectively, to the primer coating. Magnesium silicate and diatomaceous silica are extending pigments that help to reduce the gloss and enhance the adhesion of the material. A leveling agent is added to provide good flowout during spray application. A leveling agent suitable for use in the present invention is silicone resin. The remaining ingredients are solvents used to dilute the formulation to the proper viscosity for spraying.

It should be understood that, in the practice of this invention, epoxy and polyurethane resins other than those specifically disclosed above can be simultaneously cured with a primary amine or adduct thereof other than MDA. The physical properties imparted to the resulting film are dependent upon the particular resin blend chosen. Generally, epoxy resins provide strength and adhesion while polyurethane resins provide toughness and flexibility. The properties of the final product can be tailored to the requirements of a particular application by varying the mole ratios of the two resins. Also, other amines than MDA, and other carbonyl compounds than ketone, can be used to produce the curing agent used in this invention. In addition, other solvents, such as methyl isobutyl ketone, ethyl acetate, and cellosolve acetate, all of urethane grade, and any combination thereof, can be used in this invention.

Thus there has been provided a novel protective coating material which is both a corrosion inhibitive primer and a sealant flexible at low temperatures, in one coating or application thereof. This protective coating can inhibit corrosion of the metallic structure to which it is applied, can provide corrosion protection for the structure to which it is applied even if the top coating becomes cracked, can prevent the penetration of corrosive salts and stack gases to cause corrosion, can resist abrasion, has good adhesion, and can be top coated. Also, this protective coating is easy to apply, has good pot life, has good toughness, has sufficient flexibility to withstand strain and fatigue at low temperatures to prevent cracking at high stress areas, and has good tensile strength. In addition, this coating material simplifies and reduces the time required for complete application of the entire coating to a structure by substituting one material for two (primer and sealant).

Obviously, many modifications and variations of the present invention are possible in light of the above teachings. It is therefore to be understood that within the scope of the appended claims the invention may be practiced otherwise than as specifically described.

What is claimed is:

1. A method for preparing a protective coating composition, comprising:

forming a first component by mixing, in parts by weight,

| | |
|---|---|
| epoxy resin having an epoxide equivalent between 185 and 196, viscosity between 110 and 160 poises, and density between 9.6 and 9.8 lbs./gal. at 68° F | 291 |
| strontium chromate | 1701 |
| titanium dioxide | 319 |
| magnesium silicate | 788 |
| diatomaceous silica | 414 |
| leveling agent | 135 |
| methyl n-butyl ketone, urethane grade | 3386 | forming a second component by mixing, in parts by weight,

| | |
|---|---|
| ketimine curing agent | 1680 |
| methyl ethyl ketone, urethane grade | 2754 | forming a third component by mixing, in parts by weight,

| | |
|---|---|
| aromatic polyurethane resin having a 100% modulus of 400 psi at 100° C and an available isocyanate content of 2.8% | 1740 |
| polyurethane resin having a 100% modulus of 1100 psi at 100° C and an available isocyanate content of 4.1% | 873 |
| xylene, urethane grade | 1214 |
| butyl acetate, urethane grade | 699 |
| toluene, urethane grade | 634 | wherein said polyurethane resins are selected from the group consisting of a compound having the formula

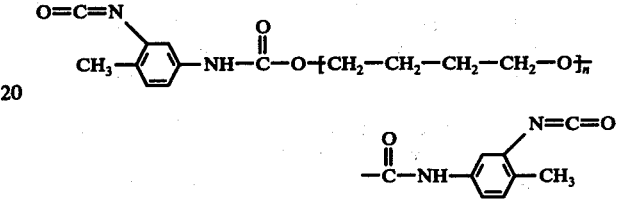

and a compound having the formula

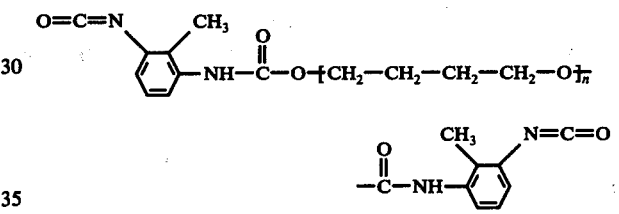

and combining said first, second and third components in equal parts by volume.

* * * * *